United States Patent
Young et al.

(10) Patent No.: US 10,313,121 B2
(45) Date of Patent: Jun. 4, 2019

(54) MAINTAINING OPERATING SYSTEM SECRETS ACROSS RESETS

(71) Applicant: Microsoft Technology Licensing, LLC, Redmond, WA (US)

(72) Inventors: Robert D. Young, Kirkland, WA (US); Jonathan Bret Barkelew, Seattle, WA (US); Ronald Aigner, Redmond, WA (US); Alain L. Michaud, Quebec City (CA); Jeremiah J. Cox, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 282 days.

(21) Appl. No.: 15/199,650

(22) Filed: Jun. 30, 2016

(65) Prior Publication Data

US 2018/0006815 A1    Jan. 4, 2018

(51) Int. Cl.
  *H04L 9/08* (2006.01)
  *G06F 12/14* (2006.01)
  (Continued)

(52) U.S. Cl.
  CPC ........ *H04L 9/0894* (2013.01); *G06F 12/1408* (2013.01); *G06F 21/575* (2013.01);
  (Continued)

(58) Field of Classification Search
  CPC .. G06F 12/1408; G06F 9/4406; G06F 21/575; G06F 21/6209; G06F 21/78;
  (Continued)

(56) References Cited

U.S. PATENT DOCUMENTS

| 7,725,703 B2 | 5/2010 | Hunter et al. |
| 8,116,455 B1 * | 2/2012 | Sussland ............... G06F 21/575 380/277 |

(Continued)

FOREIGN PATENT DOCUMENTS

WO    WO-2011022388    2/2011

OTHER PUBLICATIONS

"International Search Report and Written Opinion", Application No. PCT/US2017/038727, dated Sep. 26, 2017, 12 pages.

(Continued)

*Primary Examiner* — Ji H Bae
(74) *Attorney, Agent, or Firm* — Fiala & Weaver P.L.L.C.

(57) ABSTRACT

A device includes a reset resistant store and a trusted key service. The reset resistant store maintains data across various different device reset or data invalidation operations. The trusted key service maintains, for each of one or more operating systems that run on the device from a boot configuration, an encrypted key associated with the boot configuration. The device also has a master key that is specific to the device. Each of the keys associated with a boot configuration is encrypted using the master key. When booting the device, the boot configuration being run on the device is identified, and the key associated with that boot configuration is obtained (e.g., from the reset resistant store or the encrypted key vault). The master key is used to decrypt the obtained key, and the obtained key is used to decrypt secrets associated with the operating system run from the boot configuration.

20 Claims, 6 Drawing Sheets

(51) Int. Cl.
*G06F 21/57* (2013.01)
*G06F 21/62* (2013.01)
*G06F 21/78* (2013.01)
*G06F 9/4401* (2018.01)

(52) U.S. Cl.
CPC .......... *H04L 9/0819* (2013.01); *H04L 9/0891* (2013.01); *H04L 9/0897* (2013.01); *G06F 9/4406* (2013.01); *G06F 21/62* (2013.01); *G06F 21/6209* (2013.01); *G06F 21/6218* (2013.01); *G06F 21/78* (2013.01)

(58) Field of Classification Search
CPC ... G06F 21/6218; G06F 21/62; H04L 9/0894; H04L 9/0897
USPC ................................ 713/1, 2, 193; 726/27
See application file for complete search history.

(56) References Cited

U.S. PATENT DOCUMENTS 9,195,832 B1 * 11/2015 Rusakov ............... G06F 21/575
2003/0196100 A1    10/2003 Grawrock et al.
2005/0141717 A1 *   6/2005 Cromer ................. G06F 21/575
                                                        380/277
2011/0202916 A1     8/2011 VoBa et al.
2012/0151223 A1     6/2012 Conde Marques et al.
2014/0040605 A1     2/2014 Futral et al.
2014/0317394 A1 *  10/2014 Buhler ................. G06F 9/4416
                                                        713/2
2015/0178504 A1     6/2015 Nystrom et al.
2015/0261950 A1     9/2015 Schulz et al.
2015/0356299 A1    12/2015 Barkelew et al.

OTHER PUBLICATIONS

Berger, et al., "vTPM: Virtualizing the Trusted Platform Module", In Proceedings of 15th USENIX Security Symposium, Jul. 31, 2006, pp. 305-320.

* cited by examiner

MAINTAINING OPERATING SYSTEM SECRETS ACROSS RESETS

BACKGROUND

As computing technology has advanced, computing devices have become increasingly commonplace in our lives and used to perform various different tasks. Computing devices run an operating system that controls the operation of the device and supports running of additional applications or programs. An operating system on the computing device can be replaced, either by reinstalling the current operating system or installing a different operating system. Such installing or reinstalling of operating systems, however, can create various problems because data can be lost or otherwise be inaccessible to the new operating system. This inaccessibility to data can be frustrating for users.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more embodiments, in a computing device a master key associated with the computing device is obtained. A current boot configuration of the computing device is identified, and an encrypted boot configuration specific key associated with the current boot configuration is obtained. The master key is used to decrypt the encrypted boot configuration specific key, and the decrypted boot configuration specific key is used to decrypt data associated with the a current operating system of the computing device running from the boot configuration.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Figure 1:
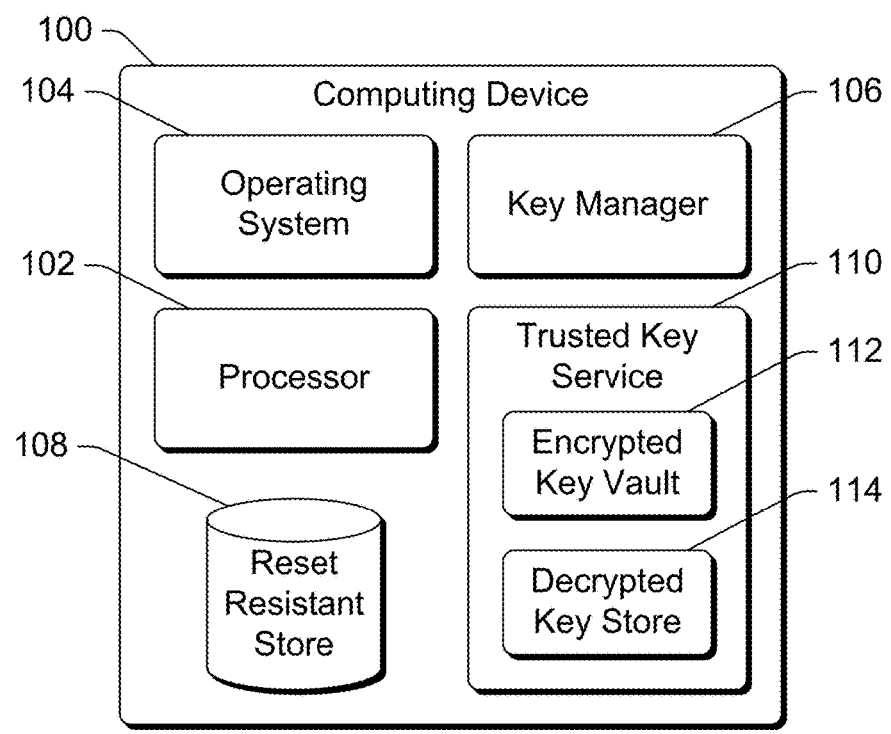
FIG. 1 is a block diagram illustrating an example computing device implementing the maintaining operating system secrets across resets in accordance with one or more embodiments.

Maintaining operating system secrets across resets is discussed herein. A computing device includes a reset resistant store and a trusted key service. The reset resistant store maintains data across various different device reset or data invalidation operations, such as reformatting of the computing device hard drive, invalidating data in the trusted key service, installing or reinstalling an operating system, and so forth. The trusted key service includes a key vault and a decrypted key store. The key vault maintains, for each of one or more boot configurations that run on the computing device, an encrypted key that is associated with the boot configuration. These encrypted keys are also backed up (e.g., copied) into the reset resistant store. The trusted key service also includes a decrypted key store that stores decrypted keys associated with the boot configuration. Which decrypted keys are stored in the decrypted key store at which times varies depending on the boot configuration for the computing device.

The computing device also has a master key that is specific to the computing device. In one or more embodiments, the master key cannot be reset by the user of the computing device, preventing the operating system secrets from becoming in accessible due to a master key change by the user. Each of the keys associated with a boot configuration for the computing device is encrypted using the master key, although the boot code and operating system running from the boot configuration themselves do not have access to the master key. The boot configuration refers to the boot code that is run as well as any data used by the boot code. Part of the boot code is a boot loader, which loads and begins execution of an operating system on the computing device. In one or more embodiments, the boot code includes all code that is run when the computing device begins to boot (e.g., in response to a device reset or the device being powered-on), up to and including a boot loader. The boot code can include, for example, a hypervisor or other virtual machine manager. By associating a key with the boot configuration rather than the operating system, if the same version of the operating system were to be run from two different boot configurations, there would be two different keys despite the operating system being the same version.

When booting the computing device, the boot configuration for the computing device is identified, and the key associated with that boot configuration is obtained (e.g., from the reset resistant store or the encrypted key vault). The master key is used to decrypt the obtained key, and the decrypted key is stored in the decrypted key store. The trusted key service protects the decrypted keys, allowing only an operating system running from the associated boot configuration to access and use the decrypted keys.

The key associated with the boot configuration is used to encrypt data associated with the boot configuration, including data associated with the operating system running from that boot configuration. For example, data that the operating system uses but does not desire to share with other operating systems that may run on the computing device is encrypted using the key associated with the boot configuration that runs the operating system. This encrypted data can be stored in various locations, such as the reset resistant store. When the computing device is subsequently rebooted with the same boot configuration, the operating system can use the key associated with the boot configuration to decrypt the encrypted data associated with the operating system.

Using the techniques discussed herein, data that an operating system running from a particular boot configuration desires to keep private (e.g., does not desire to share with other operating systems that may run on the computing device or the same operating system if run from a different boot configuration) is kept encrypted for that operating system. This data that the operating system desires to keep private is also referred to herein as a secret. If the computing device is booted with that operating system and boot configuration, then the key associated with that operating system is decrypted and available to the operating system to use to decrypt the data to be kept private. However, if the computing device is booted with another operating system and/or an operating system running from another boot configuration, that operating system will not have access to the key associated with the operating system that desires to keep the data private, and thus that operating system will not be able to decrypt and have access to the data to be kept private.

The techniques discussed herein thus provide improved security for the computing device. Data that an operating system desires to keep private can be maintained on the computing device and subsequently retrieved by that operating system when running from the same boot configuration. Other operating systems or the operating system running from other boot configurations, however, are not able to access that data to be kept private. This binding or association of secrets to boot configurations is persisted due to the reset resistant store maintaining a copy of the keys associated with the boot configurations, thus allowing the keys to be maintained across operating system re-installs, operating system resets, invalidation of data in the trusted key service, and so forth. The secrets thus remain associated with (and only accessible to) an operating system run from a boot configuration associated with boot configuration specific key, and persist on the computing device and remain accessible to the operating system despite various reset and/or invalidation operations or actions.

FIG. 1 is a block diagram illustrating an example computing device 100 implementing the maintaining operating system secrets across resets in accordance with one or more embodiments. The computing device 100 can be any of a variety of different types of devices. For example, the computing device 100 can be a desktop computer, a server computer, a laptop or netbook computer, a mobile device (e.g., a tablet or phablet device, a cellular or other wireless phone (e.g., a smartphone), a notepad computer, a mobile station), a wearable device (e.g., eyeglasses, head-mounted display, watch, bracelet), an entertainment device (e.g., an entertainment appliance, a set-top box communicatively coupled to a display device, a game console), Internet of Things (IoT) devices (e.g., objects or things with software, firmware, and/or hardware to allow communication with other devices), a television or other display device, an automotive computer, and so forth. Thus, the computing device 100 may range from a full resource device with substantial memory and processor resources (e.g., personal computers, game consoles) to a low-resource device with limited memory and/or processing resources (e.g., traditional set-top boxes, hand-held game consoles).

The computing device 100 includes a processor 102, an operating system 104, a key manager 106, a reset resistant store 108, and a trusted key service 110. The processor 102 can be any of a variety of different processing units that executes instructions (e.g., runs programs). The processor 102 can include one or more cores that each execute instructions. Although a single processor 102 is illustrated in FIG. 1, it should be noted that the computing device 100 can include any number of processors (each having any number of cores).

The operating system 104 manages running additional programs on the computing device 100. The operating system 104 also manages access to various resources of the computing device 100, such as input/output (I/O) devices. The computing device 100 typically runs a single operating system 104 at a time, although the computing device 100 can run different operating systems at different times. These different operating systems can be operating systems with different architectures (e.g., operating systems from different vendors), different versions of an operating system from the same vendor, and so forth. Additionally or alternatively, a computing device 100 can run multiple operating systems concurrently. In one or more embodiments, the operating system 104 is run as part of a virtual machine (e.g., the operating system 104 is run on or managed by a hypervisor or other virtual machine manager).

The key manager 106 manages the storage and retrieval of decryption keys (symmetric keys, or public/private key pairs) for boot configuration specific keys. The boot configuration specific key used to encrypt data can be the same as the boot configuration specific key used to decrypt the data (e.g., when using symmetric key cryptography), or different from the key used to decrypt the data (e.g., when using public key cryptography). The storage of boot configuration specific decryption keys refers to storing backups of boot configuration specific decryption keys into the reset resistant store 108, and also optionally storing decrypted boot configuration specific keys in the trusted key service 110. Although illustrated separately, the key manager 106 can optionally be implemented as part of another component or module of the computing device 100, such as part of the operating system 104, part of the trusted key service 110, and so forth.

The reset resistant store 108 maintains data across various different device reset or data invalidation operations, such as reformatting of the computing device hard drive, invalidating data in the key vault, reinstalling an operating system, and so forth. The reset resistant store 108 can be implemented using any of a variety of different storage devices. In one or more embodiments, the reset resistant store 108 is implemented using UEFI (Unified Extensible Firmware Interface) variables, such as is described in the UEFI Specification, Version 2.6 (January 2016). UEFI is a type of firmware that operates between the operating system 104 and the hardware components of the computing device 100. UEFI variables are not cleared or overwritten when hard drives are formatted or TPM's are cleared. Additionally or alternatively, the reset resistant store 108 can be implemented using other storage devices, such as a portion of a hard drive (e.g., a solid state memory drive or a magnetic disk drive) that is protected. A protected portion of a hard drive refers to a portion of the hard drive that is not erased or overwritten when the hard drive is formatted.

The data stored in the reset resistant store 108 includes data, also referred to as secrets, that the operating system 104 desires to keep private. This data is encrypted using the boot configuration specific key associated with the boot configuration that loads and runs the operating system 104. In one or more embodiments, this data is specified by the operating system 104. Additionally or alternatively, this data can be pre-provisioned in the reset resistant store 108 by a manufacturer or distributor of the computing device 100.

For example, a manufacturer desiring particular data to be made available to a specified (trusted) boot configuration on the computing device 100, but not other boot configurations, and further desiring that data should survive common resets and reformats, could store that data encrypted by the boot-configuration-bound key (the boot configuration specific key). The trusted key service 110 can backup and protect that data, encrypting the data using the boot configuration specific key, and further encrypting (using the master key) the boot configuration specific key and backing up the boot configuration specific key to the reset resistant store 108.

Various additional data is also stored in the reset resistant store 108. In one or more embodiments, this additional data includes boot configuration specific keys (and optionally metadata for matching the boot configuration specific keys to boot configurations), encrypted by the master key of the computing device 100. This storage of the encrypted boot configuration specific keys allows the boot configuration specific keys to be maintained across various different reset and/or data invalidation operations, allowing the boot configuration specific keys to be obtained and used to decrypt operating system secrets despite any such reset and/or data invalidation operations. Additionally or alternatively, this additional data can include, for example, boot configuration specific keys (and optionally metadata for matching the boot configuration specific keys to boot configurations) encrypted by a key of the trusted key service 110 or key manager 106.

Various different types of data can be kept private by the operating system 104. For example, data allowing the computing device 100 to access other devices (e.g., Bluetooth pairing keys, wireless network (e.g., Wi-Fi) credentials, etc.) can be kept private by the operating system 104. By way of another example, data allowing the computing device 100 to access various content (e.g., digital rights management (DRM) keys, software licensing keys, etc.) can be kept private by the operating system 104. By way of another example, data identifying devices or services that are authorized to manage or control the computing device 100 can be kept private by the operating system 104.

The trusted key service 110 includes an encrypted key vault 112 and a decrypted key store 114. The encrypted key vault 112 maintains, for each of one or more boot configurations for the computing device 100, an encrypted key that is associated with the boot configuration. In one or more embodiments, the boot configuration includes boot code that includes a boot loader, which loads and begins running the components of the operating system 104. The encrypted key can thus also be referred to as associated with an operating system running from a particular boot configuration. Different boot loaders will load and run different operating systems, so by associating an encrypted key with a particular boot configuration, the encrypted key is also associated with a particular operating system. Although referred to as an encrypted key, it should be noted that multiple keys can be associated with a boot configuration and that the operating system running from the boot configuration can use each of those multiple keys to encrypt or have data encrypted as desired by the operating system. The keys in the encrypted key vault 112 are encrypted and decrypted using the master key of the computing device 100.

In one or more embodiments, the encrypted key vault 112 includes an entry for each key associated with (specific to) each boot configuration. This entry includes the key itself, as well as metadata associated with the key. Such metadata can include, for example, an identifier of an operating system run from the boot configuration, an identifier of the boot configuration, and/or an identifier of policy that is to be satisfied in order to use the key.

A boot configuration specific key, after being decrypted by the master key, is stored in the decrypted key store 114. The boot configuration specific key in the decrypted key store 114 allows the operating system 104 to have data decrypted. In one or more embodiments, the operating system 104 can retrieve the boot configuration specific key from the decrypted key store 114 and use the retrieved key to decrypt data. Additionally or alternatively, the trusted key service 110 does not reveal the decrypted boot configuration specific keys to the operating system 104. Rather, the trusted key service 110 will encrypt or decrypt, using the boot configuration specific key in the decrypted key store 114, data that the operating system 104 provides to the trusted key service 110.

The trusted key service 110 can be implemented in a variety of different manners. In one or more embodiments, the trusted key service 110 is implemented using a TPM (Trusted Platform Module), such as is described in the Trusted Platform Module Library Family 2.0, Revision 1.16 (Oct. 30, 2014). In such embodiments, the encrypted key vault 112 can be implemented as nonvolatile memory of the TPM, and the decrypted key store 114 can be implemented as memory accessible to the operating system. Additionally or alternatively, the trusted key service 110 can be implemented in other manners using hardware, software, firmware, or a combination thereof.

The encrypted keys specific to (also referred to herein as associated with) the boot configurations are also backed up (e.g., copied) into the reset resistant store 108. In some situations when an operating system boots on the computing device 100, the encrypted key associated with the boot configuration from which the operating system is run is available in the encrypted key vault 112. For example, the previous time the computing device 100 was booted the encrypted key associated with the boot configuration may have been stored in the encrypted key vault 110, in which case the encrypted key associated with the boot configuration need not be retrieved from the reset resistant store 108. In other situations, the encrypted key associated with the boot configuration is not available in the encrypted key vault 110. For example, the encrypted key vault 110 may have been invalidated (e.g., reset or re-keyed) by a previously booted operating system, in which case the encrypted key associated with the boot configuration is retrieved from the reset resistant store 108 and stored in the key vault 110.

References are made herein to symmetric key cryptography, public key cryptography and public/private key pairs. Although such key cryptography is well-known to those skilled in the art, a brief overview of such cryptography is included here to assist the reader. In public key cryptography, an entity (such as a user, hardware or software component, a device, a domain, and so forth) has associated with it a public/private key pair. The public key can be made publicly available, but the entity does not divulge the private key. Without the private key it is computationally very difficult to decrypt data that is encrypted using the public key. So, data can be encrypted by any entity with the public key and only decrypted by an entity with the corresponding private key. Additionally, a digital signature for data can be generated by using the data and the private key. Without the private key it is computationally very difficult to create a signature that can be verified using the public key. Any entity with the public key can use the public key to verify the digital signature by executing a suitable digital signature verification algorithm on the public key, the signature, and the data that was signed.

In symmetric key cryptography, on the other hand, a shared key (also referred to as a symmetric key) is known by the two entities but is not divulged to other entities. Any entity having the shared key is typically able to decrypt data encrypted with that shared key. Without the shared key it is computationally very difficult to decrypt data that is encrypted with the shared key. So, if two entities both know the shared key, each can encrypt data that can be decrypted by the other, but other entities cannot decrypt the data if the other entities do not know the shared key. Similarly, an entity with a shared key can encrypt data that can be decrypted by that same entity, but other entities cannot decrypt the data if the other entities do not know the shared key. Additionally, digital signatures can be generated based on symmetric key cryptography, such as using a keyed-hash message authentication code mechanism. Any entity with the shared key can generate and verify the digital signature. For example, a trusted third party can generate a symmetric key based on an identity of a particular entity, and then can both generate and verify digital signatures for that particular entity (e.g., by encrypting or decrypting the data using the symmetric key).

Figure 2:
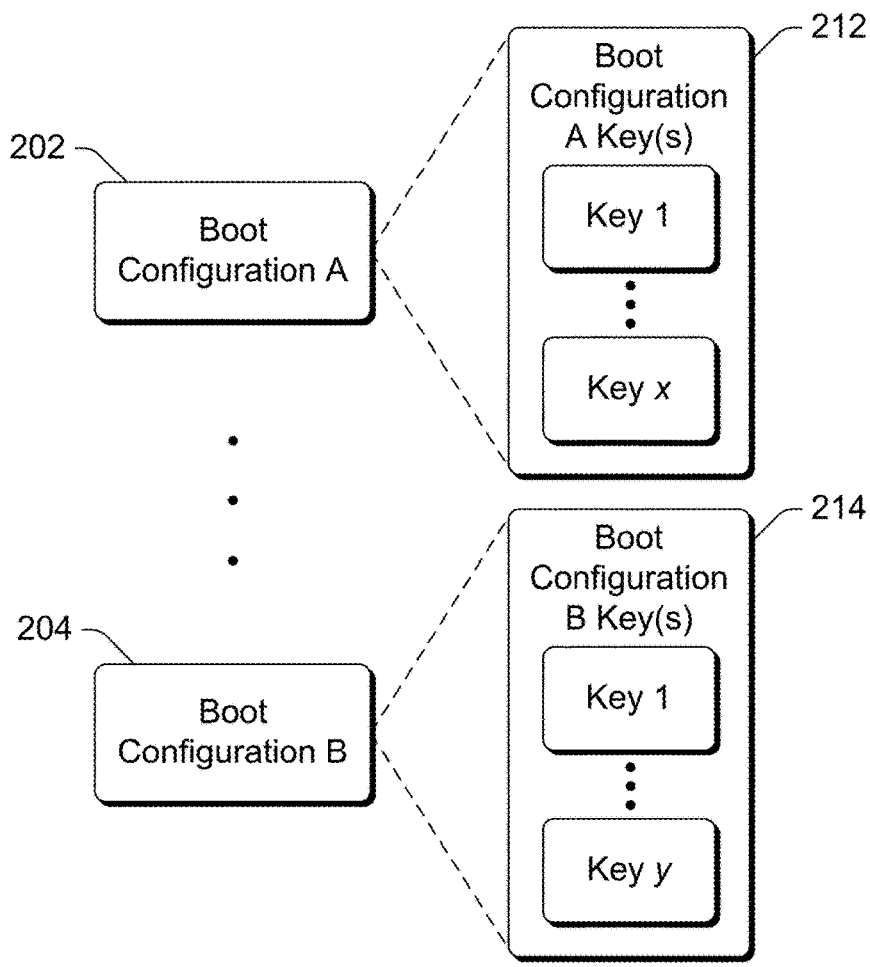
FIG. 2 illustrates example sets of keys in accordance with one or more embodiments.

FIG. 2 illustrates example sets of keys in accordance with one or more embodiments. Two different boot configurations are illustrated: boot configuration A 202 and boot configuration B 204. One or more (x) keys 212 are associated with boot configuration 202, and one or more (y) keys 214 are associated with boot configuration 204. The keys 212 and 214 are maintained in the reset resistant store 108 concurrently. Which of the keys 212 and 214 are loaded into the encrypted key vault 114 at any given time varies based on the boot configuration used to boot the computing device.

The keys 212 and 214 can also optionally be maintained in the encrypted key vault 114 concurrently. In this situation, which of the keys 212 and 214 are made available to the operating system running from a boot configuration at any given time (e.g., which keys are decrypted and stored in the decrypted key store 114) depends on the boot configuration used to boot the computing device. If the computing device is running multiple operating systems concurrently, which of the keys 212 and 214 are made available to the operating system running from a boot configuration at any given time depends on the boot configuration used to boot the computing device to run the operating system currently running on the computing device.

Although two boot configurations are illustrated in FIG. 2, keys for any number of different boot configuration can be maintained in the reset resistant store 108 concurrently.

In one or more embodiments, each of the keys 212 and 214 is a symmetric key or a public/private key pair. Additionally or alternatively, each of the keys 212 and 214 can have associated with them (e.g., stored in a same data structure) various metadata regarding they key. Such metadata can include, for example, an identifier of the boot configuration associated with the key, an identifier of policy that is to be satisfied in order to use the key, and/or a digital signature of the key (and optionally at least part of the metadata, such as the identifier of the operating system and/or the identifier of policy that is to be satisfied in order to use the key).

In one or more embodiments, the policy associated with a boot configuration specific key specifies when the data associated with an operating system running from that boot configuration is to be deleted. For example, if a particular event occurs (e.g., the computing device is sold, the computing device is no longer part of a mobile device management (MDM) system, and so forth), then the data associated with that operating system is deleted. Notification of such events can come from various sources, such as the operating system itself. In response to such an event, the encrypted data is deleted from the reset resistant store.

Returning to FIG. 1, an encrypted master key is also maintained in the computing device 100. In one or more embodiments, the encrypted master key is maintained in the reset resistant store 108. Additionally or alternatively, the encrypted master key can be maintained in other locations. For example, the encrypted key can be embedded in a component (optionally a hardware component) of the computing device 100, such as the trusted key service 110. The encrypted master key can be generated and stored in the computing device at different times, such as at the time the computing device 100 is manufactured, at a time an operating system first requests to store data that the operating system desires to keep private, and so forth.

Figure 3:
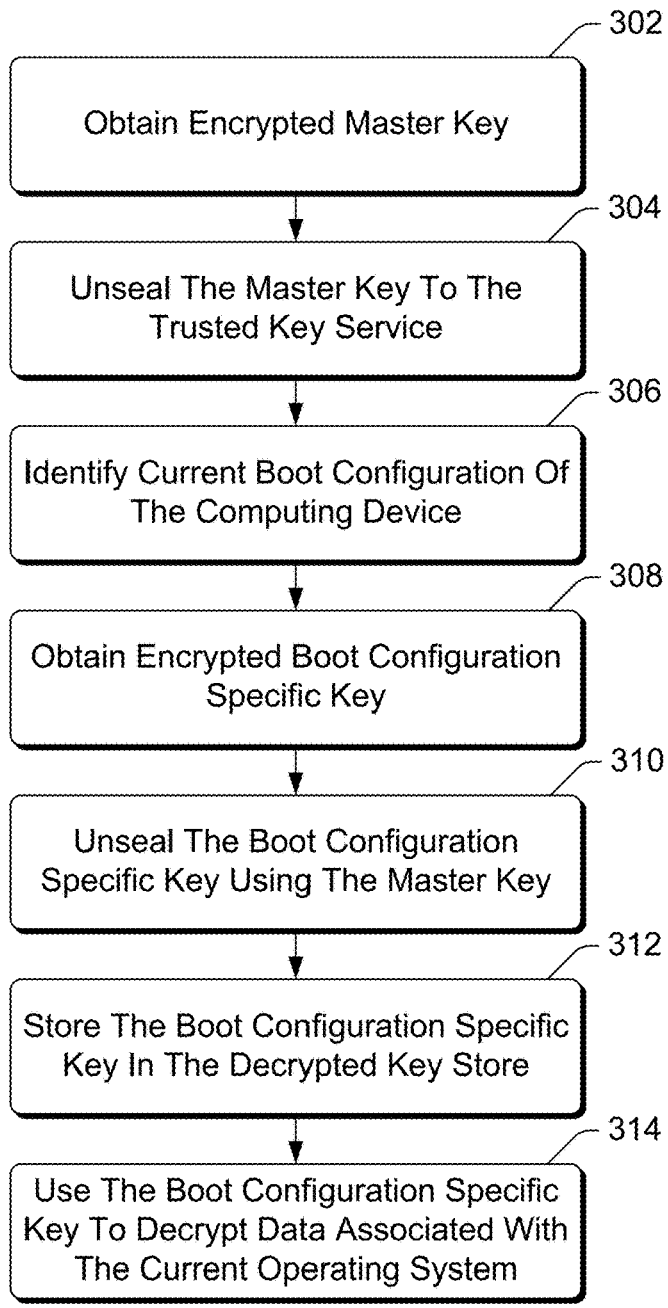
FIG. 3 is a flowchart illustrating an example process for implementing maintaining operating system secrets across resets in accordance with one or more embodiments.

FIG. 3 is a flowchart illustrating an example process 300 for implementing maintaining operating system secrets across resets in accordance with one or more embodiments. Process 300 is carried out by a device, such as computing device 100 of FIG. 1, and can be implemented in software, firmware, hardware, or combinations thereof. Process 300 is shown as a set of acts and is not limited to the order shown for performing the operations of the various acts. Process 300 is an example process for implementing maintaining operating system secrets across resets; additional discussions of implementing maintaining operating system secrets across resets are included herein with reference to different figures.

In process 300, an encrypted master key is obtained (act 302). The encrypted master key can be obtained from, for example, the reset resistant store 108, a hardware component in which the encrypted master key is embedded, and so forth.

The master key is unsealed to the trusted key service (304). Unsealing the master key to the trusted key service refers to storing the unencrypted master key in the trusted key service in a manner that allows only the trusted key service to have access to the unencrypted master key. The master key can be unsealed to the trusted key service in various different manners, such as decrypting the master key using a key known only to the trusted key service. For example, the master key can have been encrypted and stored (when the master key was generated) using a public key of a public/private key pair of the trusted key service. The trusted key service can subsequently decrypt the encrypted master key using the private key of the public/private key pair of the trusted key service.

A current boot configuration of the computing device is identified (act 306). The current boot configuration of the computing device refers to the boot code and data currently being loaded (or about to be loaded) to be run to run an operating system on the computing device, or alternatively the boot code and data currently running on the computing device. An identifier of the boot configuration system can optionally be maintained in the trusted key service. The current boot configuration can be identified in a variety of different manners.

In one or more embodiments, booting of the computing device begins with firmware (e.g., the UEFI) initially running. The firmware obtains and loads a boot loader for the operating system that the computing device is being booted with. The computing device can be booted with different operating systems at different times. Which operating system to boot at any given time can vary, such as based on a default operating system, an operating system requested by a user of the computing device, and so forth.

The firmware verifies the boot loader, such as by checking that the boot loader has been digitally signed by a trusted authority. The firmware maintains (or otherwise has access to) a record of trusted authorities. The boot loader is verified as having been digitally signed by a trusted authority if the authority that digitally signed the boot loader is included in the record of trusted authorities, or if the authority that digitally signed the boot loader can be chained back to an authority included in the record of trusted authorities (e.g., a digital certificate of the authority is digitally signed by an authority included in the record of trusted authorities).

The boot loader, once verified, begins running and loads the components of the operating system. These components can also be referred to as the boot chain. The boot loader is trusted to run only a particular operating system (or particular version of a particular operating system). Thus, the boot configuration thus represents or identifies a unique combination of boot code and data, and also (as a result of the boot code including the boot loader for a particular operating system) represents or identifies a particular operating system.

In one or more embodiments, the identifier of the current boot configuration is an identity of the trusted authority that signs the boot loader that loads the components of the current operating system. Additionally or alternatively, the identifier of the current boot configuration can be other identifiers, such as an identifier of the boot loader (e.g., a hash value generated by applying a hash function to the boot loader), an identifier of components of the boot configuration (e.g., a hash value generated by applying a hash function to one or more boot code or components), and so forth.

A boot configuration specific key is obtained (act 308). Multiple boot configuration specific keys for different boot configurations are maintained by the computing device 100 in encrypted form as discussed above. The encrypted boot configuration specific key for the current boot configuration is obtained from, for example, the encrypted key vault and/or the reset resistant store.

The boot configuration specific key is unsealed using the master key (act 310). Unsealing the boot configuration specific key to the trusted key service refers to decrypting the boot configuration specific key using the master key, and storing the decrypted boot configuration specific key in the trusted key service in a manner that allows only the trusted key service to have access to the unencrypted boot configuration specific key. The trusted key service can optionally choose to let other components (e.g., parts of the current operating system) have access to the unencrypted boot configuration specific key, or alternatively need not divulge the boot configuration specific key to the current operating system (e.g., the trusted key service can use the boot configuration specific key to encrypt and decrypt data for the current operating system without revealing the boot configuration specific key to the current operating system).

The decrypted boot configuration specific key is stored in the decrypted key store (act 312). This allows the decrypted boot configuration specific key to be accessed and used by the trusted key service without needing to be re-decrypted. Alternatively, no such storage need occur, and the trusted key service decrypts the boot configuration specific key each time it is needed for encrypting or decrypting data to be kept private for the operating system.

The boot configuration specific key is subsequently used to decrypt data associated with the current operating system (at 314). This data associated with the current boot configuration refers to data that the operating system running from the current boot configuration desires to keep private.

In one or more embodiments, various additional policies can be implemented with process 300 to determine when a key can be unsealed. Such a policy can be used to determine when the master key can be unsealed in act 304 and/or when a boot configuration specific key can be unsealed in act 310. Policies can identify any of a variety of different criteria, such as whether anti-malware is to be run on the computing device, whether the computing device has access to particular resources (e.g., network locations), which users are allowed to log into the computing device, and so forth. Each key can have associated with it a particular policy, and, prior to unsealing the key, a check is made to verify that the current policy of the computing device satisfies (e.g., matches, or at least includes all the restrictions of) the policy associated with the key. If the current policy of the computing device satisfies the policy associated with the key, then the key is unsealed. However, if the current policy of the computing device does not satisfy the policy associated with the key, then the key is not unsealed.

Returning to FIG. 1, the operating system 104 can request that particular data be kept private (e.g., not shared with other operating systems that may run on the computing device 100). The ability to have data be kept private for the operating system 104 can be implemented by, for example, the key manager 106 or the trusted key service 110. For example, application programming interface (API) methods can be exposed to the operating system 104 (e.g., by the key manager 106 or the trusted key service 110) supporting storage and retrieval of data to be kept private for the operating system 104. In response to the operating system 104 invoking the storage method, the data provided or otherwise identified by the operating system 104 is encrypted using a boot configuration key specific to the boot configuration used to load and run the operating system 104 (and thus also specific to the operating system 104), and the encrypted data is stored in the reset resistant store 108. In response to the operating system 104 invoking the retrieval method, the data identified by the operating system 104 is decrypted using the boot configuration key specific to the boot configuration used to load and run the operating system 104.

Various additional API methods can also be implemented, such as methods that can be invoked by the operating system to delete secrets, methods that can be invoked by the operating system to modify secrets, methods that can be invoked by the operating system to change the master key, and so forth. In response to a request to change the master key, the new master key is saved on the computing device 100 (e.g., in the reset resistant store 108), and the boot configuration specific keys are re-encrypted with the new master key, and the re-encrypted boot configuration specific keys are stored in the encrypted key vault 112. The encrypted key vault 112, with the boot configuration specific keys re-encrypted with the new master key, is also backed up to the reset resistant store 108.

In one or more embodiments, only particular parts of the operating system 104 are authorized to make changes to secrets (e.g., add, delete, or modify secrets), such as a kernel of the operating system 104. Alternatively, the operating system 104 may not be able to make changes to secrets, but a hypervisor (or other virtual machine manager) on which the operating system 104 runs is authorized to make changes to secrets.

The component exposing the API methods (e.g., the key manager 106 or the trusted key service 110) verifies that the requester is able to make the requested changes. This verification can be performed in a variety of different manners. In one or more embodiments, the component exposing the API methods verifies that the method is being invoked by a process running in kernel mode (or a request from a hypervisor or other virtual machine manager). Additionally or alternatively, a key can be passed (e.g., from the boot loader) to the component(s) that is entitled to make changes to the secrets as well as to the component exposing the API methods. A request to change a secret is digitally signed by the requester using this key, and the component exposing the API methods verifies the digital signature. Only components that are authorized to make changes to the secrets have the key, so the component exposing the API methods knows that a request is from a component authorized to change the secrets if the digital signature on the request is verified.

Additionally or alternatively, different keys for different secrets can be passed to different components that are entitled to make changes to those different secrets. Which components are entitled to make changes to which secrets can be specified in various manners, such as policy included in metadata associated with the key used to decrypt the secret. For example, any component of the operating system may be entitled to make changes to a first secret, but only the operating system kernel may be entitled to make changes to a second secret. In this example, a first key (for the first secret) is passed to the operating system (e.g., from the boot loader) that is accessible to both user and kernel mode process of the operating system, and a second key (for the second secret) is passed to the operating system (e.g., from the boot loader) that is accessible only to kernel mode processes. Thus, any process of the operating system can digitally sign a request to change the first secret using the first key, but only a kernel mode process can digitally sign a request to change the second secret using the second key.

Situations can arise in which the encrypted key vault is to be copied to (also referred to as backed up to) the reset resistant store 108. Keeping a copy of the encrypted key vault 112 in the reset resistant store 108 allows the keys in the encrypted key vault 112 to be maintained even if invalidated in the trusted key service 110. The encrypted key vault 112 can be backed up to the reset resistant store 108 in response to various different events, such as generation of a new key for the current operating system, changing of a key used by the current operating system, changing of the master key, and so forth. For example, the current operating system may change its boot configuration specific key to a new key, have data that the operating system desires to keep private decrypted and then re-encrypted using the new key, and then have the encrypted key vault 112 including the new key backed up to the reset resistant store 108.

Figure 4:
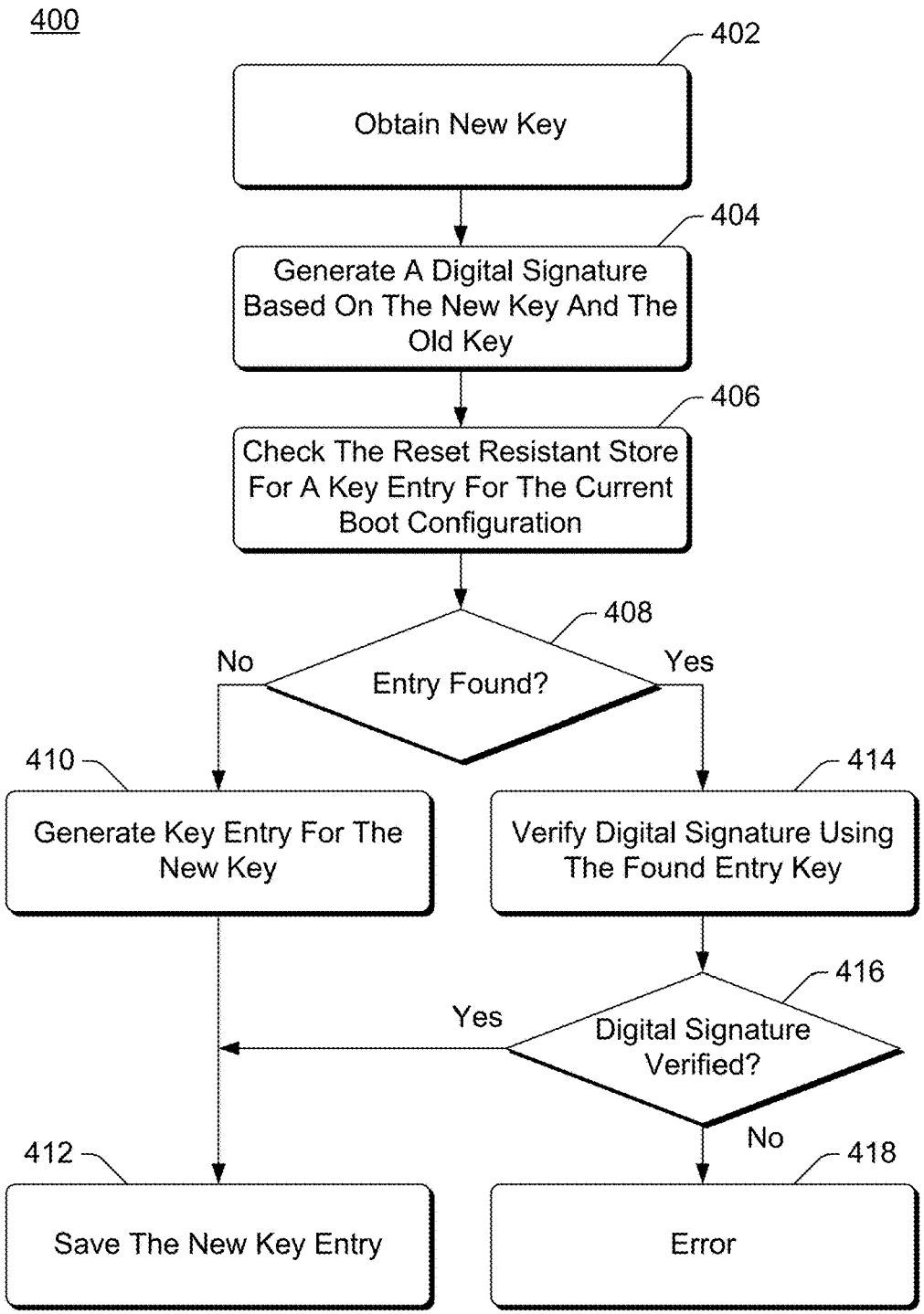
FIG. 4 is a flowchart illustrating an example process for backing up an encrypted key vault in accordance with one or more embodiments.

FIG. 4 is a flowchart illustrating an example process 400 for backing up an encrypted key vault in accordance with one or more embodiments. Process 400 is carried out by a device, such as computing device 100 of FIG. 1, and can be implemented in software, firmware, hardware, or combinations thereof. Process 400 is shown as a set of acts and is not limited to the order shown for performing the operations of the various acts. Process 400 is an example process for backing up an encrypted key vault; additional discussions of backing up an encrypted key vault are included herein with reference to different figures.

In process 400, a new key is obtained (act 402). Additional metadata associated with the key can also be obtained, such as an identifier of the current operating system running on the computing device, an identifier of the boot configuration associated with the key, and/or an identifier of policy that is to be satisfied in order to use the key.

A digital signature is generated based on the new key and the old key (act 404). The digital signature is optionally generated based on metadata (e.g., an identifier of the current operating system running on the computing device, an identifier of the boot configuration associated with the key, and/or an identifier of policy that is to be satisfied in order to use the key) as well. The digital signature is generated by, for example, digitally signing, using the old key for the current boot configuration (e.g., obtained from the decrypted key store), a combination (e.g., a concatenation) of the metadata and the new key. The new key is digitally signed by the trusted key service.

The reset resistant store is checked for a key entry for the current boot configuration (act 406). The reset resistant store can includes a copy of the encrypted key vault, and thus can include entries for boot configuration specific keys for multiple different boot configurations as discussed above. In act 406 the reset resistant store is checked for a key entry for the current boot configuration of the computing device implementing process 400. This check can be made based on the identifier of the boot configuration. For example, the key entries in the reset resistant store are retrieved, decrypted (using the master key), and searched to find a key entry having the identifier of the boot configuration.

Process 400 proceeds based on whether a key entry for the current boot configuration is found in the reset resistant store (act 408).

If a key entry for the current boot configuration is not found in the reset resistant store, then a new key entry is created (act 410). This new key entry includes the new key (obtained in act 402), and metadata associated with the new key (e.g., an identifier of the current operating system running on the computing device, an identifier of the boot configuration associated with the key, and/or an identifier of policy that is to be satisfied in order to use the key).

The new key entry is then saved (act 412). Saving the new key entry includes saving the new key entry in the encrypted key vault of the trusted key service. Saving the new key entry also includes encrypting the new key entry (using the master key) and saving the encrypted new key entry in the reset resistant store. The encrypted new key entry can overwrite the previous key entry for the current boot configuration in the reset resistant store, or the previous key entry for the current boot configuration can otherwise be deleted from the reset resistant store.

Returning to act 408, if a key entry for the current boot configuration is found in the reset resistant store, then the digital signature of the found entry is verified (act 414). The digital signature of the found entry is verified by generating a digital signature in the same manner as the digital signature is generated in act 404, except that the digital signature is generated in act 414 based on the key in the entry found in the reset resistant store. For example, the digital signature in act 414 is generated by digitally signing, using the key in the entry found in the reset resistant store, a combination (e.g., a concatenation) of the metadata and the new key. If the digital signature generated in act 414 based on the key found in the entry in the reset resistant store matches (e.g., is the same as) the digital signature generated in act 404, then the digital signature of the found entry is verified.

Process 400 proceeds based on whether the digital signature of the found entry is verified (act 416).

If the digital signature of the found entry is not verified, then an error has occurred (act 418). Various different error handling processes can then be performed.

However, if the digital signature of the found entry is verified in act 416, then the new key entry is saved (act 412). Saving the new key entry includes saving the new key entry in the encrypted key vault of the trusted key service. Saving the new key entry also includes encrypting the new key entry (using the master key) and saving the encrypted new key entry in the reset resistant store. As a previous key entry was not found in the reset resistant store, no previous key entry need be overwritten or otherwise deleted from the reset resistant store.

In one or more embodiments, the encrypted key vault is backed up manually, which refers to the operating system 104 requesting the backup. Thus, if the operating system 104 changes the boot configuration specific key or the master key is changed, the operating system can have the new boot configuration specific key backed up. Additionally or alternatively, the encrypted key vault is backed up automatically. A component of the computing device 100 (e.g., the key manager 106 or the reset resistant store 108) can determine to back up the encrypted key vault at regular or irregular intervals, in response to a user logging off the computing device 100, in response to the operating system 104 shutting down, and so forth. When automatically backing up the encrypted key vault, there may be no new key, and thus the current boot configuration specific key is treated as both the new key and the old key.

Returning to FIG. 1, situations can arise in which keys are to be copied from (also referred to as restored from) the reset resistant store 108 to the encrypted key vault 112. This can occur, for example, in situations in which the key has been deleted from the encrypted key vault 112. In one or more embodiments, restoring a key from the reset resistant store 108 restores only the key for the current boot configuration of the computing device. Alternatively, keys for multiple boot configurations can restored from the reset resistant store 108.

Figure 5:
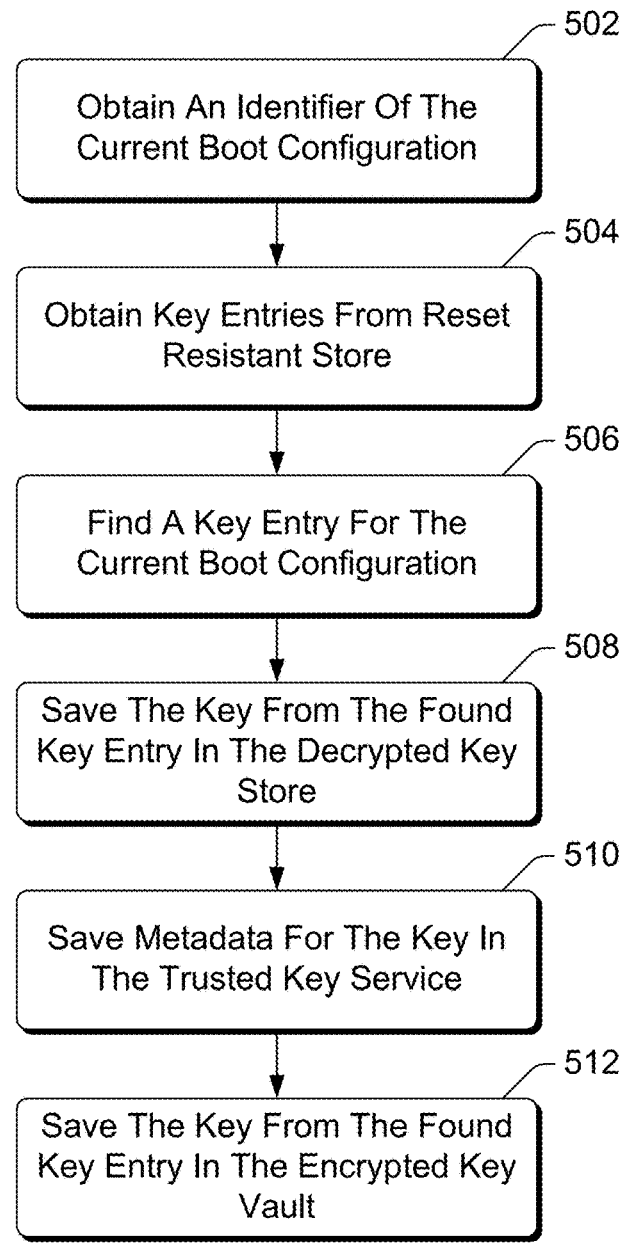
FIG. 5 is a flowchart illustrating an example process for restoring a key to an encrypted key vault in accordance with one or more embodiments.

FIG. 5 is a flowchart illustrating an example process 500 for restoring a key to an encrypted key vault in accordance with one or more embodiments. Process 500 is carried out by a device, such as computing device 100 of FIG. 1, and can be implemented in software, firmware, hardware, or combinations thereof. Process 500 is shown as a set of acts and is not limited to the order shown for performing the operations of the various acts. Process 500 is an example process for restoring a key to an encrypted key vault; additional discussions of restoring a key to an encrypted key vault are included herein with reference to different figures.

In process 500, an identifier of the current boot configuration is obtained (act 502). This identifier is, for example, the same identifier discussed above with respect to act 306 of FIG. 3.

The key entries are obtained from the reset resistant store (act 504). These key entries are the entries that were previously written to the reset resistant store when backing up the encrypted key vault.

A key entry for the current boot configuration is found (act 506). The key entry for the current boot configuration is found based on the identifier of the current boot configuration. For example, the key entries obtained from the reset resistant store are decrypted (using the master key) and searched to find a key entry having the identifier of the current operating system.

The key from the key entry found in act 506 is saved in the decrypted key store (act 508). The key entry was decrypted in act 506, and thus need not be re-decrypted.

Metadata for the key is optionally saved in the trusted key service (act 510). This metadata can be, for example, an identifier of policy that is to be satisfied in order to use the key. The metadata can be saved in, for example, various registers of the trusted key service. Alternatively, if no metadata is associated with the key, then act 510 need not be performed.

The key from the key entry found in act 506 is also saved in the encrypted key vault (act 512). The key is encrypted (using the master key) and saved in the encrypted key vault. Metadata associated with the key can also optionally be saved in the encrypted key vault (encrypted using the master key, or without being encrypted).

The techniques discussed herein support various different usage scenarios. Data (secrets) that an operating system desires to keep private can be encrypted using a key specific to the boot configuration used to run that operating system and the encrypted data can be stored. When the computing device is rebooted with that same boot configuration and operating system, the operating system can retrieve previously stored secrets and have them decrypted using the key specific to that operating system. Other operating systems, or the same operating system run with a different boot configuration (e.g., malicious boot code attempting to obtain the secrets) will not have access to that key and thus will not be able to decrypt the data.

The encrypted data is stored in a reset resistant store. This reset resistant store is not deleted when a trusted key service (e.g., a TPM) is cleared, is not overwritten when hard drive(s) of the computing device are formatted, is not overwritten when an operating system is installed or re-installed on the computing device, is not deleted when the computing device is reset, and so forth. Thus, if an operating system is reinstalled on a computing device, the operating system can still obtain its secrets.

For example, an operating system may generate Bluetooth pairing keys allowing the operating system to communicate with a Bluetooth device (e.g., speakers, microphone, etc.). These Bluetooth pairing keys are treated as secrets by the operating system, and encrypted using the specific key for the boot configuration. If the computing device is re-booted with that same boot configuration and operating system, then those Bluetooth pairing keys can be decrypted and used by the operating system, alleviating the operating system and the user of the computing device from needing to re-pair the computing device with the Bluetooth device. However, if the computing device were to be booted with a different boot configuration and/or operating system, the Bluetooth pairing keys would not be available to that different operating system or operating system running from that different boot configuration.

It should be noted that the techniques discussed herein provide local backup of the encrypted key vault. Rather than storing the encrypted key vault on a remote service (e.g., a server accessed via the Internet), the encrypted key vault is stored in a local reset resistant store (e.g., in registers or a nonvolatile memory of the computing device). Thus, to use the techniques discussed herein the computing device need not have access to the Internet, need not prove or otherwise identify itself to a remote service, and so forth.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
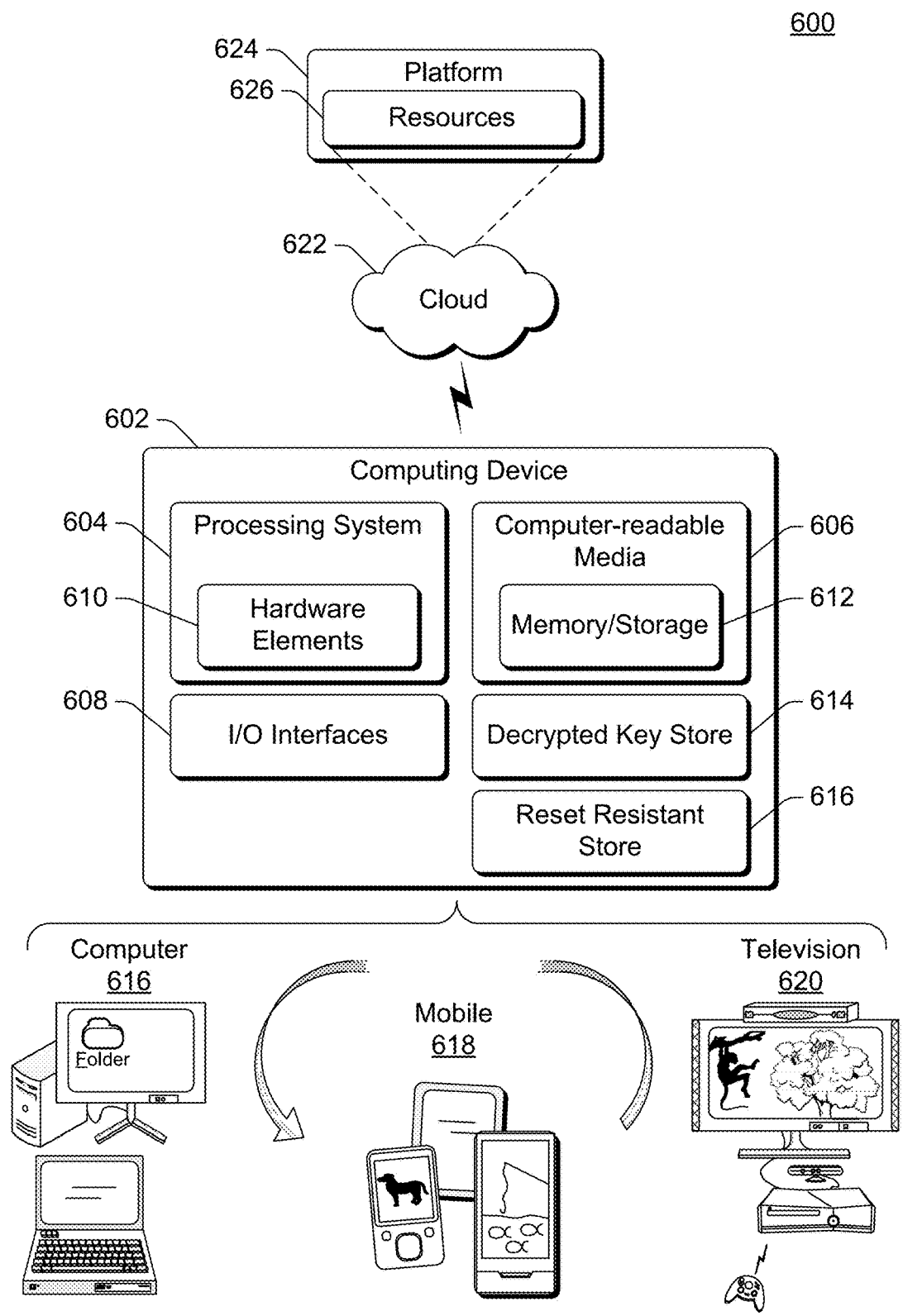
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

The one or more input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes a decrypted key store 614 and a reset resistant store 616. The decrypted key store 614 maintains boot configuration specific keys after being decrypted. The decrypted key store 614 can be, for example, the decrypted key store 114 of FIG. 1. The reset resistant store 616 maintains data across various different device reset or data invalidation operations, such as reformatting of the computing device hard drive, resetting or re-keying of data in the key vault, reinstalling an operating system, and so forth. The reset resistant store 616 can be, for example, the reset resistant store 108 of FIG. 1.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A method implemented in a computing device, the method comprising: obtaining a master key associated with the computing device; identifying a current boot configuration of the computing device; obtaining an encrypted boot configuration specific key associated with the current boot configuration; using the master key to decrypt the encrypted boot configuration specific key; and using the decrypted boot configuration specific key to decrypt data associated with a current operating system of the computing device running from the boot configuration.

Alternatively or in addition to any of the above described methods, any one or combination of: the method further comprising allowing changes to the data associated with the current operating system only if a policy associated with the boot configuration specific key is satisfied; the method further comprising maintaining the data associated with the current operating system across operating system re-installs and operating system resets; the method further comprising maintaining the decrypted boot configuration specific key in a Trusted Platform Module, and maintaining the data associated with the current operating system despite invalidating of data in the Trusted Platform Module; the method further comprising maintaining the encrypted data associated with the current operating system in a reset resistant store of the computing device that persists across operating system re-installs and operating system resets; the reset resistant store comprising a Unified Extensible Firmware Interface variable; the method further comprising maintaining the encrypted boot configuration specific key in a trusted key service, and backing up the encrypted operating system key from the trusted key service to the reset resistant store; operating systems from different vendors having different boot configuration specific keys, and each of the different ones of the operating systems from different vendors having different data associated with the operating system; different versions of an operating system having different boot configuration specific keys, and each of the different versions of the operating system having different data associated with the operating system.

A computing device comprising: a reset resistant store configured to maintain one or more encrypted secrets associated with a particular operating system; a trusted key service including an encrypted key vault; the encrypted key vault configured to maintain an encrypted boot configuration key specific to a boot configuration used to run the particular operating system; and the trusted key service configured to decrypt the encrypted boot configuration specific key and use the boot configuration specific key to decrypt data associated with the particular operating system only if the particular operating system is being booted or is running on the computing device.

Alternatively or in addition to any of the above described computing devices, any one or combination of: the reset resistant store maintaining the data associated with the particular operating system across re-installs of the particular operating system, resets of the particular operating system, and invalidation of data in the trusted key service; the reset resistant store comprising one or more Unified Extensible Firmware Interface variables; the trusted key service comprising a Trusted Platform Module; the trusted key service being further configured to back up the encrypted key vault to the reset resistant store; the particular operating system comprising a particular version of an operating system, and the trusted key service being configured to decrypt the encrypted boot configuration specific key and use the boot configuration specific key to decrypt data associated with the particular version of the operating system only if the particular version of the operating system is being booted on the computing device.

A computing device comprising: one or more processors; and a computer-readable storage medium having stored thereon multiple instructions that, responsive to execution by the one or more processors, cause the one or more processors to perform operations comprising: obtaining a master key associated with the computing device; identifying a current boot configuration of the computing device; obtaining an encrypted boot configuration specific key associated with the current boot configuration; using the master key to decrypt the encrypted boot configuration specific key; and using the decrypted boot configuration specific key to decrypt data associated with a current operating system of the computing device running from the boot configuration and maintained by the computing device across resets of the computing device.

Alternatively or in addition to any of the above described computing devices, any one or combination of: the operations further comprising maintaining the decrypted boot configuration specific key in a Trusted Platform Module, and maintaining the data associated with the current operating system despite invalidation of data in the Trusted Platform Module and re-installation of the operating system; the operations further comprising maintaining the encrypted data associated with the current operating system in a reset resistant store of the computing device that persists across operating system re-installs and operating system resets, maintaining the encrypted boot configuration specific key in a trusted key service, and backing up the encrypted boot configuration specific key from the trusted key service to the reset resistant store; operating systems from different vendors having different boot configuration specific keys, and each of the different ones of the operating systems from different vendors having different data associated with the operating system; the computing device comprising allowing changes to the data associated with the current operating system only if a policy associated with the boot configuration specific key is satisfied.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
    obtaining a master key associated with the computing device;
    identifying a current boot configuration of the computing device;
    obtaining an encrypted boot configuration specific key associated with the current boot configuration;
    using the master key to decrypt the encrypted boot configuration specific key; and
    using the decrypted boot configuration specific key to decrypt encrypted data associated with a current operating system of the computing device running from the current boot configuration, the master key and the encrypted data being stored in a reset resistant store of the computing device that persists across operating system re-installs and operating system resets.

2. The method as recited in claim 1, further comprising allowing changes to the data associated with the current operating system only if a policy associated with the boot configuration specific key is satisfied.

3. The method as recited in claim 1, further comprising maintaining the decrypted boot configuration specific key in a Trusted Platform Module, and maintaining the data associated with the current operating system despite invalidating of data in the Trusted Platform Module.

4. The method as recited in claim 1, the reset resistant store comprising a Unified Extensible Firmware Interface variable.

5. The method as recited in claim 1, further comprising:
maintaining the encrypted boot configuration specific key in a hardware-implemented trusted key service; and
backing up the encrypted boot configuration specific key from the hardware-implemented trusted key service to the reset resistant store.

6. The method as recited in claim 1, operating systems from different vendors having different boot configuration specific keys, and each of the different ones of the operating systems from different vendors having different data associated with the operating system.

7. The method as recited in claim 1, different versions of an operating system having different boot configuration specific keys, and each of the different versions of the operating system having different data associated with the operating system.

8. The method as recited in claim 1, wherein the master key is encrypted when obtained.

9. The method as recited in claim 8, further comprising unsealing the encrypted master key and storing the unencrypted master key; and
using the unencrypted master key to decrypt the boot configuration specific key.

10. A computing device comprising:
a reset resistant store configured to maintain a master key and encrypted data associated with a particular operating system across re-installs of the particular operating system and resets of the particular operating system;
hardware that implements a trusted key service including an encrypted key vault;
the encrypted key vault configured to maintain an encrypted boot configuration specific key specific to a boot configuration used to run the particular operating system; and
the trusted key service configured to decrypt the encrypted boot configuration specific key and use the boot configuration specific key to decrypt data associated with the particular operating system only if the particular operating system is being booted or is running on the computing device.

11. The computing device as recited in claim 10, the reset resistant store further maintains the data associated with the particular operating system across invalidation of data in the trusted key service.

12. The computing device as recited in claim 10, the reset resistant store comprising one or more Unified Extensible Firmware Interface variables.

13. The computing device as recited in claim 10, the trusted key service comprising a Trusted Platform Module.

14. The computing device as recited in claim 10, the trusted key service being further configured to back up the encrypted key vault to the reset resistant store.

15. The computing device as recited in claim 10, the particular operating system comprising a particular version of an operating system, and the trusted key service being configured to decrypt the encrypted boot configuration specific key and use the boot configuration specific key to decrypt data associated with the particular version of the operating system only if the particular version of the operating system is being booted on the computing device.

16. A computing device comprising:
one or more processors; and
a computer-readable storage medium having stored thereon multiple instructions that, responsive to execution by the one or more processors, cause the one or more processors to perform operations comprising:
obtaining a master key associated with the computing device;
identifying a current boot configuration of the computing device;
obtaining an encrypted boot configuration specific key associated with the current boot configuration;
using the master key to decrypt the encrypted boot configuration specific key; and
using the decrypted boot configuration specific key to decrypt encrypted data associated with a current operating system of the computing device running from the current boot configuration, the master key and the encrypted data being stored in a reset resistant store of the computing device that persists across operating system re-installs and operating system resets.

17. The computing device as recited in claim 16, the operations further comprising:
maintaining the decrypted boot configuration specific key in a Trusted Platform Module; and
maintaining the data associated with the current operating system despite invalidation of data in the Trusted Platform Module.

18. The computing device as recited in claim 16, the operations further comprising:
maintaining the encrypted boot configuration specific key in a hardware-implemented trusted key service; and
backing up the encrypted boot configuration specific key from the hardware-implemented trusted key service to the reset resistant store.

19. The computing device as recited in claim 16, operating systems from different vendors having different boot configuration specific keys, and each of the different ones of the operating systems from different vendors having different data associated with the operating system.

20. The computing device as recited in claim 16, further comprising allowing changes to the data associated with the current operating system only if a policy associated with the boot configuration specific key is satisfied.

* * * * *